US012781033B2

(12) United States Patent
Bonavoglia et al.

(10) Patent No.: US 12,781,033 B2
(45) Date of Patent: Nov. 3, 2026

(54) MOLDED ARTICLE

(71) Applicant: Dow Global Technologies LLC, Midland, MI (US)

(72) Inventors: Barbara Bonavoglia, Zurich (CH); Georgia Natacha Eftalie Bitinis, Tarragona (ES)

(73) Assignee: Dow Global Technologies LLC, Midland, MI (US)

( * ) Notice: Subject to any disclaimer, the term of this patent is extended or adjusted under 35 U.S.C. 154(b) by 353 days.

(21) Appl. No.: 18/578,098

(22) PCT Filed: Oct. 26, 2022

(86) PCT No.: PCT/US2022/047862
§ 371 (c)(1),
(2) Date: Jan. 10, 2024

(87) PCT Pub. No.: WO2023/076366
PCT Pub. Date: May 4, 2023

(65) Prior Publication Data

US 2024/0309186 A1 Sep. 19, 2024

Related U.S. Application Data

(60) Provisional application No. 63/272,931, filed on Oct. 28, 2021.

(51) Int. Cl.

| | |
|---|---|
| ***C08L 23/0876*** | (2025.01) |
| ***A45D 34/02*** | (2006.01) |
| ***B29C 45/00*** | (2006.01) |
| ***B29K 23/00*** | (2006.01) |
| ***B29K 33/00*** | (2006.01) |
| ***B29K 105/00*** | (2006.01) |
| ***B29L 31/56*** | (2006.01) |

(52) U.S. Cl.
CPC .......... *C08L 23/0876* (2013.01); *A45D 34/02* (2013.01); *B29C 45/0001* (2013.01); *B29K 2023/00* (2013.01); *B29K 2023/08* (2013.01); *B29K 2033/08* (2013.01); *B29K 2105/0032* (2013.01); *B29L 2031/565* (2013.01)

(58) Field of Classification Search
CPC ........... C08L 23/0876; B29K 2023/00; B29K 2023/04; B29K 2023/08; B29K 2023/12; B29K 2096/005
See application file for complete search history.

(56) References Cited

U.S. PATENT DOCUMENTS

| | | | | |
|---|---|---|---|---|
| 4,801,649 | A | 1/1989 | Statz | |
| 5,703,166 | A | 12/1997 | Rajagopalan et al. | |
| 8,906,479 | B2 | 12/2014 | Chou et al. | |
| 2013/0317139 | A1* | 11/2013 | Majewski | B32B 27/08 524/91 |
| 2014/0171548 | A1 | 6/2014 | Oh et al. | |
| 2015/0126306 | A1 | 5/2015 | Sullivan et al. | |
| 2018/0291169 | A1* | 10/2018 | Yu | C08J 9/103 |

FOREIGN PATENT DOCUMENTS

| | | |
|---|---|---|
| JP | 2004217759 | 8/2004 |

* cited by examiner

*Primary Examiner* — Christopher M Rodd

(57) ABSTRACT

An injection molded closure article comprising a composition blend of: (a) at least one substantially linear polyolefin elastomer component which has a melt index of, for example, from 0.5 dg/min to 40 dg/min and a density of, for example, from 0.850 g/cc to 0.910 g/cc; and (b) at least one neutralized ethylene acid copolymer resin component which has a melt index of, for example, from 0.5 dg/min to 25 dg/min, and is at least partially neutralized at a range of from 20% to 70% neutralization; a molded closure article produced from the above composition blend, wherein the molded closure article has a high gloss, low haze, high impact resistance, and high chemical resistance; and a process of manufacturing the above molded closure article.

12 Claims, No Drawings

MOLDED ARTICLE

FIELD

The present invention relates to an injection molded article; and more specifically, the present invention relates to an injection molded article fabricated for use in perfume and cosmetic packaging. In one particular embodiment for example, the injection molded article can be a translucent and/or colored perfume container cap member or closure member used for containers in cosmetic applications; and the closure member can be fabricated from a molding polymer blend composition.

BACKGROUND

The perfume and cosmetic industries are constantly looking for packaging materials for their products as cosmetic packaging represents the brand values and identity of a company; and the company's mission. At the same time, the perfume and cosmetic industries desire cosmetic packaging materials that provide high-quality packaging and that have properties such as high impact strength, high chemical resistance, flexibility, and high gloss surface. In the perfume caps industry, colorful or natural looking caps, i.e., translucent, colored and decorated caps, for perfume bottles are highly desirable.

While polyolefins-based blends have been used for various applications (for example, see U.S. Pat. No. 5,703,166A which discloses a composition of metallocene catalyzed polymers and ionomer blends for use in golf ball applications), polyolefins-based blends are not commonly used for manufacturing packaging products for perfume and cosmetic applications because such known polyolefins-based blends provide packaging products that lack the aesthetic properties (e.g., high gloss and translucency) required for perfume and cosmetic applications. Instead, known polyolefins-based blends provide packaging products having low gloss and an opaque appearance. Thus, it is a challenge to provide polyolefins-based blend compositions that can be used in perfume and cosmetic applications, particularly for producing translucent and/or colored perfume caps for the perfume and cosmetic industry. Polymer blend compositions used in perfume and cosmetic applications should be designed and selected to be adequate for manufacturing perfume and cosmetic packaging products with adequate optical properties such as high gloss and low haze.

Therefore, it is desired to provide a perfume and cosmetic packaging article, such as a closure article (e.g., a cap) for perfume and cosmetic containers including, for example, a translucent and/or colored perfume cap for the perfume and cosmetic industry. Also, it is desired to produce an injection molded article using a polyolefin/partially neutralized ethylene acid copolymer blend that can provide injection molded articles such as perfume caps having a high gloss and a low haze while maintaining the other mechanical properties of the caps such as high impact resistance and chemical resistance.

SUMMARY

In one general embodiment, the present invention is directed to an injection molded article such as an injection molded cap or closure for a perfume or cosmetic vessel or container (e.g., a bottle), wherein the injection molded article comprises an injection molding composition including a blend of: (a) at least one polyolefin elastomer (POE) component and (b) at least one partially neutralized ethylene acid copolymer resin component; wherein the injection molded article exhibits several good properties such as high gloss, low haze, high impact resistance, and high chemical resistance.

In one preferred embodiment, the injection molded closure article comprises an injection molding composition blend of: (a) at least one POE component such as at least one substantially linear polyolefin elastomer component, wherein the at least one substantially polyolefin elastomer has a melt index of, for example, from 0.5 dg/min to 40 dg/min and a density of, for example, from 0.850 g/cc to 0.910 g/cc; and (b) at least one partially neutralized ethylene acid copolymer resin component; wherein the at least one partially neutralized ethylene acid copolymer resin comprises magnesium, lithium, zinc, sodium, and mixtures thereof; wherein the comonomer of the at least one partially neutralized ethylene acid copolymer resin comprises acrylic acid, methacrylic acid or mixtures thereof; wherein the comonomer content is, for example, from 9 wt % to 30 wt % based on the total weight of the monomers present in the at least one partially neutralized ethylene acid copolymer resin; and wherein the melt index of the at least one partially neutralized ethylene acid copolymer resin is, for example, from 0.5 dg/min to 25 dg/min.

In another embodiment, the present invention is directed to a process for preparing the above injection molded article.

In still another embodiment, the present invention is directed to a translucent and/or colored perfume cap or closure for a perfume and/or cosmetic container comprising a POE/partially neutralized ethylene acid copolymer composition blend.

In addition to the good properties exhibited by the injection molded article as described above, the present invention advantageously includes, for example, good processability of the injection molded article.

The above features and other features, aspects, and advantages of the embodiments described herein of the present invention will become better understood and readily apparent to those skilled in the art with reference to the following detailed description, including, but not limited to, the appended claims.

It is to be understood that both the foregoing general description and the following detailed description describe various embodiments and are intended to provide an overview or framework for understanding the nature and character of the claimed subject matter of the present invention.

DETAILED DESCRIPTION

Temperatures used herein are in degrees Celsius (° C.).

As used herein, a "substantially linear polyolefin elastomer" with reference to a polyolefin polymer, herein means that the polymer includes short chain branches attributable to any comonomer incorporation; and, the polymer includes long chain branches. For example, "substantially linear" polymers include polymers that have a back bone substituted with from 0.01 to 3 long-chain branches per 1,000 carbons in the polymer's backbone. In addition, substantially linear polymers are characterized by a narrow molecular weight distribution and a narrow short chain branching distribution. Substantially linear polyolefin elastomers, such as ethylene polymer elastomers (or "substantially linear ethylene/alpha-olefin copolymers"), used in the practice of the present invention are known; and in one embodiment these polymers and a method of preparing these polymers are described in U.S. Pat. Nos. 5,272,236; 5,278,272; and 5,705, 565. Substantially linear ethylene polymers are also characterized as having a melt flow ratio I10/I2 which is greater than or equal to 5.63, and a molecular weight distribution (as determined by gel permeation chromatography) Mw/Mn which is less than or equal to I10/I2-4.63.

Generally, the substantially linear ethylene polymers are prepared by using constrained geometry catalysts and are characterized by a narrow molecular weight distribution and if an interpolymer, by a narrow comonomer distribution. As herein used, "interpolymer" means a polymer of two or more comonomers, e.g., a copolymer, terpolymer, etc. or in other words, a polymer made by polymerizing ethylene with at least one other comonomer. Other basic characteristics of these substantially linear ethylene polymers include a low residuals content (i.e., low concentrations in the substantially linear ethylene polymer of the catalyst used to prepare the polymer, unreacted comonomers, and low molecular weight oligomers made during the course of the polymerization), and a controlled molecular architecture which provides good processability even though the molecular weight distribution is narrow relative to conventional olefin polymers.

The term "copolymer" herein refers to a polymer comprising copolymerized units resulting from copolymerization of two comonomers.

An "acid copolymer" herein refers to a polymer comprising copolymerized units of an $\alpha$-olefin, an $\alpha,\beta$-ethylenically unsaturated carboxylic acid.

The term "ethylene acid copolymer" herein refers to a copolymer of ethylene and at least one acid-based monomer.

The term "partially neutralized ethylene acid copolymer" (also referred to as an "ionomer") herein refers to a copolymer of ethylene and at least one acid-based monomer; wherein the copolymer of ethylene and at least one acid-based monomer has been at least partially neutralized by a metal-containing neutralizing agent.

"Cosmetics" are products which are constituted from a mixture of chemical compounds derived from either natural sources, or synthetically created ones. The term "cosmetics" or "cosmetic products" herein is defined per the Food and Drug Administration (FDA) in the United States, which regulates cosmetics in the United States. Herein the term "cosmetics" or "cosmetic products" means materials or articles intended to be rubbed, poured, sprinkled, or sprayed on, introduced into, or otherwise applied to, the human body for cleansing, beautifying, promoting attractiveness, or altering the appearance of the human body without affecting the human body's structure or functions. Included in the above term of "cosmetics" or "cosmetic products" herein are any materials intended for use as an ingredient of a cosmetic product. Cosmetics can include, for example but not limited to, eye and facial "makeup products" such as lipstick, mascara, eye shadow, foundation, blush, highlighter, bronzer; and several other product types such as fragrants, perfumes, fingernail polishes, skin moisturizers, shampoos, permanent waves, hair colors, toothpastes, deodorants, and the like.

"Cosmetic applications" herein includes, but is not limited to: (1) cosmetics designed for skin care that can be used to cleanse, exfoliate and protect the skin, as well as replenishing the skin, through the use of cleansers, toners, serums, moisturizers, and balms; (2) cosmetics designed for more general personal care, such as shampoo and body wash, that can be used to cleanse the body; (3) cosmetics designed to enhance one's appearance ("makeup") that can be used to conceal blemishes, enhance one's natural features (such as the eyebrows and eyelashes), add color to a person's face and, in the case of more extreme forms of makeup used for performances, fashion shows and people in costume, that can be used to change the appearance of the face entirely to resemble a different person, creature or object; and (4) cosmetics designed to add fragrance to the human body such as through the use of perfumes.

The term "cosmetic packaging" herein includes "primary packaging" and "secondary packaging" of cosmetic products. The term "primary packaging" herein means the housing of the cosmetic product such as a container having a cosmetic product inside the container. The term "secondary packaging" herein means the outer wrapping of one or several primary packaging(s) or cosmetic container(s).

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

The numerical ranges disclosed herein include all values from, and including, the lower and upper value. For ranges containing explicit values (e.g., a range from 1, or 2, or 3 to 5, or 6, or 7), any subrange between any two explicit values is included (e.g., the range 1 to 7 above includes subranges 1 to 2; 2 to 6; 5 to 7; 3 to 7; 5 to 6; and the like).

As used throughout this specification, the abbreviations given below have the following meanings, unless the context clearly indicates otherwise: "=" means "equal(s)" or "equal to"; "<" means "less than"; ">" means "greater than"; "≤" means "less than or equal to"; "≥" means "greater than or equal to"; g=gram(s); Kg=kilogram(s); g/cm3 or g/cc=gram(s) per cubic centimeter; kg/m3=kilogram(s) per cubic meter; m=meter(s); mm=millimeter(s); cm=centimeter(s); μm=micron(s), min=minute(s); s=second(s); dg/min=decigram(s) per minute; Pa=pascals; MPa=megapascals; Mn=number average molecular weight; Mw=weight average molecular weight; pts=part(s) by weight; 1/s or sec-1=reciprocal second(s) [s-1]; cm-1=inverse centimeter(s) [cm-1]; ° C.=degrees Celsius; kJ/m3=kilojoules per cubic meter; %=percent; vol %=volume percent or percent by volume; and wt %=weight percent or percent by weight.

Unless stated otherwise, all percentages, parts, ratios, and the like amounts, are defined by weight. For example, all percentages stated herein are weight percentages (wt %), unless otherwise indicated.

Specific embodiments of the present invention are described herein below. These embodiments are provided so that this disclosure is thorough and complete; and fully conveys the scope of the subject matter of the present invention to those skilled in the art.

In one broad embodiment, the present invention includes an injection molded article for use in cosmetic applications. The molded article according to embodiments herein may have any shape, size and dimensions. In one general embodiment, the injection molded article is useful in the cosmetics industry for fabricating cosmetic packaging. For example, in some embodiments the molded article may be a container or a closure for the container (e.g., a cap of a perfume bottle) intended for use in the cosmetics industry.

In one preferred embodiment, the injection molded article is a translucent and/or colored perfume cap for a perfume bottle and/or other cosmetic containers; wherein the cap is fabricated using a POE/partially neutralized ethylene acid copolymer composition blend.

The injection molded article, formed from the blend composition in accordance with the present invention exhibits several properties which are particularly useful for cosmetic applications. For example, the properties of the molded article can include a high gloss, low haze, high impact resistance, and high chemical resistance; and, when the molded article is a closure for a cosmetic container, such as a perfume cap for a perfume bottle, the cap can be, for example, translucent and/or the cap can be colored.

For example, the impact strength of the molded article used in the present invention generally can be ≥50 kJ/m3 in one embodiment, from 50 kJ/m3 to 100 kJ/m3 in another embodiment, and from 70 kJ/m3 to 100 kJ/m3 in still another embodiment.

For example, the flexural modulus of the molded article used in the present invention generally can be ≥200 MPa in one embodiment, from 250 MPa to 400 MPa in another embodiment, and from 250 MPa to 350 MPa in still another embodiment.

For example, the gloss 60° of the molded article used in the present invention generally can be ≥900 in one embodiment, from 90° to 120° in another embodiment, and from 90° to 110° in still another embodiment.

For example, the haze of the molded article used in the present invention generally can be ≤60% in one embodiment, from 20% to 60% in another embodiment, and from 20% to 40% in still another embodiment.

Colorants and pigments can be added to the injection molding blend composition to provide a colored cap or closure article. For example, the amount of color of the molded article used in the present invention generally can be from 0.001 wt % to 5 wt % in one embodiment, from 0.05 wt % to 1 wt % in another embodiment, and from 0.05 wt % to 0.5 wt % in still another embodiment. In other embodiments, the colorants or pigments can be added via a masterbatch.

In a broad embodiment, the composition of the present invention is a blend, combination, composite, or mixture of two or more components and includes, for example, (a) at least one POE component; and (b) at least one partially neutralized ethylene acid copolymer resin component. In a preferred embodiment, the blend composition of the present invention includes (a) at least one substantially linear polyolefin elastomer component (POE) component wherein the substantially linear POE has a predetermined density and a predetermined MI; and (b) at least one partially neutralized ethylene acid copolymer resin component. The partially neutralized ethylene acid copolymer resin component can be one or more components including for example a blend, mixture or combination of two or more partially neutralized ethylene acid copolymer resins. If desired, other optional components or additives, as component (c), can be added to the blend composition such as pigments, mineral charges, optical brighteners, and the like.

In a general embodiment, the POE component, component (a), used in the present invention can be, for example, a substantially linear ethylene/alpha-olefin copolymer wherein the ethylene is copolymerized with a comonomer to form the POE composition; and wherein the comonomer includes, for example, butene, hexene, octene, and mixtures thereof.

A catalyst is used in forming the substantially linear ethylene/alpha-olefin copolymers; and the catalyst can include, for example, so-called "single-site catalyst" systems known in the art such as "metallocene" and "constrained geometry" catalysts. A "single site catalyst" herein means a catalyst which provides a single type of catalytically effective site at which polymer chain extension occurs. The single-site catalysts and methods for their preparation are disclosed, for example, in U.S. Pat. Nos. 6,511,568B1; 6,806,338; 8,835,582B2; and 9,725,537B2. Single site catalysts such the metallocene-based single site catalysts for ethylene/α-olefin copolymerization provides a resin having lower catalyst residues and improved organoleptic properties. Particularly preferred as single site catalysts are the metallocenes, optionally supported on inorganic or organic substrates, in particular on porous oxides such as silica, alumina or silica-alumina. Advantageously these may also be used in combination with a co-catalyst such as an aluminoxane.

In some embodiments, the POE useful in the present invention can be selected from commercially available POE products. For example, the POE used to form the blend composition can include ENGAGE™ and AFFINITY™ (both available from The Dow Chemical Company (Dow)); Exact (available from ExxonMobil); Queo (available from *Borealis*); Supreme POE (available from SK Chemicals); and mixtures thereof.

The POE component can also be combined with other optional components to form the blend POE component, for example, an ultra-low-density polyethylene (ULDPE) can be used; and components such as non-substantially linear ethylene/alpha-olefin copolymers can be used including for example ATTANE™ (available from Dow) and Clearflex (available from Versalis S.p.a.).

The concentration of the POE used in the blend composition is from 0.5 wt % to 50 wt % in one general embodiment; from 5 wt % to 40 wt % in another embodiment; and from 10 wt % to 30 wt % in still another embodiment.

The POE useful in the present invention has a predetermined density and MI. For example, the predetermined density of the POE is less than or equal to 0.910 g/cm3 in one general embodiment; from 0.850 g/cc to 0.910 g/cc in another embodiment; from 0.860 g/cc to 0.900 g/cc in still another embodiment; and from 0.860 g/cc to 0.880 g/cc in yet another embodiment.

The predetermined MI of the POE useful in the present invention is greater than or equal to 0.5 dg/min in one general embodiment; from 0.5 dg/min to 40 dg/min in another embodiment; from 3 dg/min to 40 dg/min in still another embodiment; and from 4 dg/min to 40 dg/min in yet another embodiment.

In a general embodiment, the partially neutralized ethylene acid copolymer resin composition component, component (b), used in the present invention can be, for example, at least a partially neutralized ethylene acid copolymers which are materials having highly desirable properties for uses in molded articles such as cosmetics containers; and the partially neutralized ethylene acid copolymers are well suited for the types of injection molding processes for forming such injection molded articles.

The partially neutralized ethylene acid copolymer resins useful in the present invention in general are well known to one skilled in the art and can include any of the partially neutralized ethylene acid copolymer resins described in, for example, WO2021/003117A1; and the partially neutralized ethylene acid copolymer resins can be prepared in accordance with the method described, for example, in WO2021/003117A1.

The partially neutralized ethylene acid copolymer resins useful in the present invention can be produced by any means known to one skilled in the art, such as by neutralization of an ethylene acid copolymer with one or more metal ions derived from a metal-containing neutralizing agent. An ethylene acid copolymer is a polymer that includes repeat units derived from (i) ethylene and (ii) a comonomer such as acrylic acid, methacrylic acid, ethacrylic acid, or combinations of two or more thereof. The comonomer is used, for example, from 9 wt % to 30 wt % in one general embodiment and from 9 wt % to 25 wt % in still another embodiment, based on the total weight of the monomers present in the ethylene acid copolymer.

As aforementioned, in some embodiments the acid groups of the neutralized ethylene acid copolymer resin is at least partially neutralized. The neutralization of acid groups in these resins can range, for example, from 0.1% to 100% of carboxylic acid groups in the neutralized ethylene acid copolymer resin being neutralized with a metal ion sourced from a metal-containing neutralizing agent, based on the total carboxylic acid content in one general embodiment; from 10% to 90% in another embodiment, from 20% to 80% in still another embodiment, and from 20% to 70% in yet another embodiment. The metal ions useful in the present invention may include monovalent, divalent, trivalent, multivalent, or combinations of two or more thereof. Examples of the metal ions include Li, Na, K, Ag, Hg, Cu, Be, Mg, Ca, Sr, Ba, Cd, Sn, Pb, Fe, Co, Zn, Ni, Al, Sc, Hf, Ti, Zr, Ce, and combinations of two or more thereof. If the metal ion is multivalent, a complexing agent, such as a stearate, an oleate, a salicylate, or a phenolate radical can be included, as disclosed in U.S. Pat. No. 3,404,134. In some preferred embodiments, examples of neutralizing metal ions used in the present invention include sodium (Na), zinc (Zn), or combinations thereof. Further examples of the neutralizing metal ions used in the present invention include Na or Zn ions derived from salts (metal-containing neutralizing agents) such as NaOH, NaHC03, Na2CC>3, NaHS04, NaEbPC^, Na2HP03, sodium stearate, sodium oleate, sodium salicylate, sodium phenolate, Zn(OH)2, ZnCCb, ZnCC>3, ZnSC>4, Z11HPO4, Z11HPO3, zinc oxide, zinc stearate, zinc oleate, zinc salicylate, zinc phenolate, Mg(OH) 2, MgCCb, MgSC>4, MgHP04, MgHPCb, magnesium stearate, magnesium oleate, magnesium salicylate, magnesium phenolate, or combinations of two or more thereof.

In some embodiments, the neutralized ethylene acid copolymer may be a partially neutralized ethylene acid copolymer formed from a precursor ethylene acid copolymer. The precursor ethylene acid copolymer may include copolymerized units of ethylene and from 9 wt % to 30 wt % copolymerized units of an α,β-ethylenically unsaturated carboxylic acid having from 3 carbon atoms to 8 carbon atoms, based on the total weight of the precursor ethylene acid copolymer. All individual values and subranges of from 9 wt % to 30 wt % are included and disclosed herein. For example, in some embodiments, the precursor ethylene acid copolymer includes copolymerized units of ethylene and from 9 wt % to 25 wt % of copolymerized units of an α,β-ethylenically unsaturated carboxylic acid having from 3 carbon atoms to 8 carbon atoms in one embodiment, from 9 wt % to 25 wt % of copolymerized units of an α,β-ethylenically unsaturated carboxylic acid having from 3 carbon atoms to 8 carbon atoms in another embodiment, and from 9 wt % to 22 wt % of copolymerized units of an α,β-ethylenically unsaturated carboxylic acid having from 3 carbon atoms to 8 carbon atoms in still another embodiment, based on the total weight of the precursor ethylene acid copolymer. The comonomer content may be measured using any suitable technique, such as techniques based on nuclear magnetic resonance ("NMR") spectroscopy, and, for example, by 13C NMR analysis as described in U.S. Pat. No. 7,498,282.

In some embodiments, the neutralized acid copolymer of the molded article may be an ethylene acid copolymer resin that is at least partially neutralized and that has a MI of, for example, greater than or equal to 0.5 g/10 min in one general embodiment; and from 0.5 g/10 min to 25 g/10 min in another embodiment, as measured according to ASTM D1238. In other preferred embodiments, the neutralized acid copolymer of the molded article may be a at least partially neutralized ethylene acrylic acid and/or methacrylic acid copolymer in which ethylene acrylic acid and/or methacrylic acid groups of the copolymer are at least partially neutralized with Na ions. In still other preferred embodiments, the neutralized acid copolymer of the molded article may include from 9 wt % to 30 wt % of copolymerized units of acrylic acid or methacrylic acid; and from 70 wt % to 91 wt % of copolymerized units of ethylene, based on the total weight of the neutralized acid copolymer.

In some embodiments, the neutralized acid copolymer of the molded article may have some of its carboxylic acid groups of the neutralized acid copolymer being neutralized as carboxylic acid salts comprising sodium cations. For example, from 20% to 70% of the carboxylic acid groups of the neutralized acid copolymer can be neutralized in one embodiment; from 30% to 70% of the carboxylic acid groups of the neutralized acid copolymer can be neutralized in another embodiment, and from 40% to 70% of the carboxylic acid groups of the neutralized acid copolymer can be neutralized in still another embodiment.

Examples of suitable α,β-unsaturated carboxylic acids having 3 carbon atoms to 8 carbon atoms may include, without limitation, acrylic acids, methacrylic acids, itaconic acids, maleic acids, fumaric acids, monomethyl maleic acids, and combinations of two or more of these acid comonomers. In some embodiments, the α,β-unsaturated carboxylic acids having 3 carbon atoms to 8 carbon atoms comprises acrylic acid and methacrylic acid. In one preferred embodiment, the α,β-unsaturated carboxylic acids having 3 carbon atoms to 8 carbon atoms comprises acrylic acid.

The precursor ethylene acid copolymer has a MI of from 10 g/10 min to 4,000 g/10 min in one general embodiment. MI is determined according to ASTM D1238 at 190° C. and 2.16 kg. All individual values and subranges of the general range 10 g/10 min to 4,000 g/10 min are included and disclosed herein. For example, in some embodiments, the precursor ethylene acid copolymer may have a MI of from 10 g/10 min to 2,500 g/10 min in one embodiment, from 10 g/10 min to 1,250 g/10 min in another embodiment, from 25 g/10 min to 1,000 g/10 min in still another embodiment, from 25 g/10 min to 750 g/10 min in yet another embodiment, from 50 g/10 min to 500 g/10 min in even still another embodiment, and from 100 g/10 min to 450 g/10 min in even yet another embodiment.

The precursor ethylene acid copolymer may be synthesized in a continuous process in which each of the reactive comonomers and solvent(s), if any, are continuously fed, together with an initiator, into a stirred reactor. The choice of initiator is based on the anticipated reactor temperature range coupled with the decomposition temperature of the initiator, the criteria for this selection being well-understood in the industry. In general, during the synthesis by copolymerization of ethylene and acid comonomers to produce the precursor ethylene acid copolymer, the reaction temperature may be maintained at from 120° C. to 300° C. in one embodiment and from 140° C. to 260° C. in another embodiment. The pressure in the reactor may be maintained at from 130 MPa to 310 MPa in one embodiment and from 165 MPa to 250 MPa in another embodiment.

The reactor may be, for example, an autoclave reactor, such as the reactor described in U.S. Pat. No. 2,897,183, which describes a type of autoclave reactor that is equipped with means for intensive agitation. U.S. Pat. No. 2,897,183 also describes a continuous process for the polymerization of ethylene under a "substantially constant environment." This environment is maintained by keeping certain parameters, for example, pressure, temperature, initiator concentration, and the ratio of polymer product to unreacted ethylene, substantially constant during the polymerization reaction. Such conditions may be achieved in any of a variety of continuously stirred tank reactors, among them, for example, continuously stirred isothermal reactors and continuously stirred adiabatic reactors.

The reaction mixture, which contains the precursor acid copolymer, is vigorously agitated and continuously removed from the autoclave. After the reaction mixture leaves the reaction vessel, the resulting precursor acid copolymer product is separated from the volatile unreacted monomers and solvent(s), if any, by conventional procedures, such as by vaporizing the unpolymerized materials and solvent(s) under reduced pressure or at an elevated temperature. Non-limiting examples of precursor acid copolymers include copolymers under the tradename NUCREL™ (available from Dow) and Primacor (available from SK Chemicals).

In general, during the polymerization reaction to produce the precursor ethylene acid copolymer, the reactor contents may be maintained under conditions such that a single phase is present substantially throughout the reactor. This can be accomplished by adjusting reactor temperature, by adjusting reactor pressure, by addition of co-solvents, or by any combination of these techniques, as described in U.S. Pat. No. 5,028,674. Conventional means may be used to determine whether a single phase is maintained substantially throughout the reactor. For example, Hasch et al., in "High-Pressure Phase Behavior of Mixtures of Poly(Ethylene-co-Methyl Acrylate) with Low Molecular Weight Hydrocarbons," Journal of Polymer Science: Part B: Polymer Physics, Vol. 30, 1365-1373 (1992), describe a cloud-point measurement that can be used in determining the boundary between single phase and multiphase conditions.

To obtain the partially neutralized ethylene acid copolymers useful in the molded articles according to embodiments of this disclosure, the precursor ethylene acid copolymers are neutralized with a base comprising a metal cation such that the acid groups (for example, carboxylic acid) in the precursor acid copolymer react to form acid salt groups (for example, carboxylate salts). In some embodiments herein some of the acid groups derived from the α,β-ethylenically unsaturated carboxylic acid of the precursor ethylene acid copolymer are neutralized. As described above, for example, from 20% to 70% of the acid groups derived from the α,β-ethylenically unsaturated carboxylic acid of the precursor acid copolymer are neutralized in one general embodiment. Additional information on the preparation of ionomers can be found in U.S. Pat. Nos. 3,264,272 A and 3,322,734 A, each of which is hereby incorporated by reference in its entirety. Non-limiting examples of partially neutralized ethylene acid copolymers include ionomers under the tradename SURLYN™ (available from Dow).

Any stable cation and any combination of two or more stable cations are believed to be suitable as counterions to the acid groups in the precursor ethylene acid copolymer in order to neutralize the acid groups, resulting in an at least partially neutralized ethylene acid copolymer. The counterions to the acid groups in the partially neutralized ethylene acid copolymer may include, for example, divalent and monovalent cations, such as cations of alkali metals, alkaline earth metals, and some transition metals. In some embodiments, the cation is a divalent cation such as, zinc, calcium, or magnesium, for example. In other embodiments, the cation is a monovalent cation such as potassium or sodium, for example. In further embodiments, the acid groups derived from the α,β-ethylenically unsaturated carboxylic acid of the precursor acid copolymer are neutralized by a base containing sodium ions. The base containing sodium ions can provide a sodium partially neutralized ethylene acid copolymer wherein the hydrogen atoms of the acid groups of the precursor acid are replaced by sodium cations. To obtain the copolymers useful as the neutralized acid copolymers in some embodiments, the precursor acid copolymers may be neutralized by any conventional procedure, such as those described in U.S. Pat. Nos. 3,404,134 and 6,518,365.

Although the blend composition of the present invention, in one general embodiment, includes two components (a) and (b), the blend composition may be formulated with a wide variety of optional additives to enable performance of specific functions while maintaining the excellent benefits/properties/performance of the present invention blend composition. The optional component(s), component (c), may be added to component (a) of the blend composition; or the optional component(s) may be added to component (b) of the blend composition; or the optional component(s) may be added to both components (a) and (b) of the blend composition. For example, in one embodiment, the optional additives, component (c), useful in the blend formulation may include any one or more pigments or any of the colored masterbatches described, for example in WO2021/003117A1; mineral charges; optical brighteners; compatibilizers; and mixtures thereof.

The amount of the optional additives, component (c), useful for adding to the blend formulation, when used, can be generally in the range of from 0.001 wt % to about 5 wt % in one embodiment; from 0.01 wt % to 1 wt % in another embodiment; and from 0.01 wt % to 0.5 wt % in still another embodiment based on the total weight of the components.

In a general embodiment, the blend composition is formed by admixing, blending, mixing the POE and partially neutralized ethylene acid copolymer components together; and any other optional components as desired, to form a uniform mixture. The process for forming the blend composition includes, for example, mixing the components (a) and (b) together in the desired concentrations discussed above; and then the one or more additional optional components (c) may be added to the composition as desired. The order of mixing of the components is not critical and two or more components can be mixed together followed by addition of the remaining components. The blend composition components may be mixed together by any conventional mixing process and equipment. For example, the POE component (a) and the partially neutralized ethylene acid copolymer composition component (b) can be dry blended or compound blended with a proper apparatus for dry blending or compound blending to form the blend composition.

In another embodiment of the present invention, the blend composition can be used in an injection molding process to fabricate an injection molded article such as a perfume bottle cap or closure. In general, the process for fabricating the molded article includes the steps of:

(I) providing a POE component and a partially neutralized ethylene acid copolymer composition component as described above; and other optional materials, as desired;

(II) blending the components of step (I);

(III) feeding the blend composition of step (II) into an injection molding apparatus; and (IV) injection molding the blend composition to form an injection molded article.

The components provided in step (I) includes, for example, solids such as solid particles, pellets, flakes, fibers, strands, powder, and mixtures thereof; liquids such as liquid pigments; and mixtures thereof.

The blending step (II) of the present invention process is carried out by dry blending or by compounding the components together at a temperature of from 90° C. to 220° C. in one general embodiment; from 90° C. to 190° C. in another embodiment; and from 90° C. to 160° C. in still another embodiment.

The injection molding step (IV) of the present invention process is carried out at a melt temperature of from 150° C. to 220° C. in one embodiment and from 170° C. to 200° C. in another embodiment.

In one embodiment, the molded article, formed from the blend composition in step (IV) can include, any molded cosmetic packaging product or any molded article useful in cosmetic packaging applications; and in one preferred embodiment, the molded article formed is a cap or closure for a perfume container or a cosmetic container.

One of the advantages of the present invention process is that the steps of the process of the present invention described above can be carried out by several conventional processes and equipment known in the art.

Embodiments of the molded articles according to this disclosure should be understood to include embodiments of molded articles prepared according to an embodiment of a method according to this disclosure or by any other suitable method that results in a molded article as described in this disclosure.

Unless otherwise defined, all technical and scientific terms used herein have the same meaning as commonly understood by one of ordinary skill in the art of molded articles or molding technologies. The terminology used in the description herein is for describing particular embodiments only and is not intended to be limiting. As used in the specification and appended claims, the singular forms "a," "an," and "the" are intended to include the plural forms as well, unless the context clearly indicates otherwise.

EXAMPLES

The following Inventive Examples (Inv. Ex.) and Comparative Examples (Comp. Ex.) (collectively, "the Examples") are presented herein to further illustrate the features of the present invention but are not intended to be construed, either explicitly or by implication, as limiting the scope of the claims. The Inventive Examples of the present invention are identified by Arabic numerals and the Comparative Examples are represented by letters of the alphabet. The following experiments analyze the performance of embodiments of molded articles described herein. The embodiments of molded articles and their associated preparation methods will be better understood by reference to the following Examples, which are offered by way of illustration and which one skilled in the art of molded articles or molding technologies will recognize are not meant to be limiting. Unless otherwise stated all parts and percentages are by weight on a total weight basis.

Raw Materials

The raw materials used in the Examples include (1) a partially neutralized ethylene acid copolymer component and (2) a polymer component. The components are used for forming a blend composition.

The polymers used in the Examples include the polyethylene materials and the POE materials described in Table I.

TABLE I

Materials

| Product | Brief Description | Supplier | MFI (g/10 min$^{-1}$) | Density (g/cm$^{-3}$) |
|---|---|---|---|---|
| LDPE 525E | Low density polyethylene (LDPE) | Dow | 3.2 | 0.930 |
| LDPE 740E | LDPE | Dow | 7.5 | 0.920 |
| ELITE ™ 5230 GC | Linear low density polyethylene (LLDPE) | Dow | 4.0 | 0.916 |
| ENGAGE ™ 8407 | Polyolefin elastomer (POE) | Dow | 30.0 | 0.870 |
| ENGAGE ™ 8207 | POE | Dow | 5.0 | 0.870 |
| ENGAGE ™ 8402 | POE | Dow | 30.0 | 0.902 |

General Procedure for Fabricating a Blend Composition

The process of fabricating the blend composition for testing includes dry blending or compounding partially neutralized ethylene acid copolymer (or ionomer) and PE components to form a sample blend composition. The ionomer used in the Examples is SURLYN™ PC-2000 (available from Dow); and the PE components used are described in Table II. The mixture or blend compositions described in Table II were used in the Examples as described in Table II.

TABLE II

| Example No. | Partially Neutralized Ethylene Acid Copolymer (wt %) | Blend Component | PE (wt %) |
|---|---|---|---|
| Comp. Ex. A | 75 | ELITE ™ 5230GC | 25 |
| Comp. Ex. B | 75 | DOW ™ LDPE 525E | 25 |
| Comp. Ex. C | 75 | DOW ™ LDPE 740E | 25 |
| Inv. Ex. 1 | 75 | ENGAGE ™ 8402 | 25 |
| Inv. Ex. 2 | 75 | ENGAGE ™ 8207 | 25 |
| Inv. Ex. 3 | 75 | ENGAGE ™ 8407 | 25 |

General Procedure for Fabricating a Molded Specimen

The process of fabricating a molded specimen for testing includes first forming the blend compositions described in Table II above and then injection molding the blend composition to form a molded specimen which is thereafter characterized. The following Table III describes general injection molding settings using an injection press (Dr Boy 55E, screw diameter 24 mm, clamping force 55 tons) for injecting tensile bars of ISO 527 type 1A specimen. Table IV reports the specific pressures used for the Examples.

TABLE III

General Injection Molded Conditions for Tensile Bars (ISO 527 Type 1A).

| | | |
|---|---|---|
| Injection Temperature Set Temperatures, ° C. | Nozzle | 190 |
| | Zone 4 | 180 |
| | Zone 3 | 180 |
| | Zone 2 | 170 |
| | Zone 1 | 150 |
| | Inlet | 35 |
| Mold Temperature, ° C. | | 14 |
| Screw Rotation, 1/min | | 150 |
| Shot Volume, mm | | 52 |
| Change Over, mm | | 26 |
| Melt Cushion, mm | | 8 |
| Injection Pressure, bar | | 1,500 |
| Holding Pressure, bar | | 1,100 |
| Back Pressure, bar | | 70 |
| Injection Time, s | | 0.5 |
| Holding Time, s | | 40 |
| Cooling Time, s | | 10 |

TABLE IV

Specific Pressures Used for Tensile Bars (ISO 527 type 1A) in Examples

| Pressure | Comp. Ex. A | Comp. Ex. B | Comp. Ex. C | Inv. Ex. 1 | Inv. Ex. 2 | Inv. Ex. 3 |
|---|---|---|---|---|---|---|
| Holding Pressure, bar | 1,200 | 1,000 | 1,000 | 1,100 | 1,100 | 1,100 |
| Back Pressure, bar | 50 | 50 | 50 | 70 | 70 | 70 |

Table V describes the general injection molding settings for an injection press (Dr Boy 55E, screw diameter 24 mm, 55 tons) used in the Examples for injecting plate specimens having the dimensions of 60 mm×60 mm×2 mm. Table VI reports the specific pressures used for the Examples.

TABLE V

General Injection Molded Conditions for 60 × 60 × 2 mm Plates

| | | |
|---|---|---|
| Injection Temperature Set Temperatures, ° C. | Nozzle | 190 |
| | Zone 4 | 180 |
| | Zone 3 | 180 |
| | Zone 2 | 170 |
| | Zone 1 | 150 |
| | Inlet | 35 |
| Mold Temperature, ° C. | | 14 |
| Screw Rotation, 1/min | | 130 |
| Shot Volume, mm | | 45 |
| Change Over, mm | | 23 |
| Melt Cushion, mm | | 14 |
| Injection Pressure, bar | | 1,500 |
| Holding Pressure, bar | | 950 |
| Back Pressure, bar | | 10 |
| Injection Time, s | | 0.2 |
| Holding Time, s | | 20 |
| Cooling Time, s | | 10 |

TABLE VI

Specific Pressure Used for 60 × 60 × 2 mm Plates in Examples.

| Pressure | Comp. Ex. A | Comp. Ex. B | Comp. Ex. C | Inv. Ex. 1 | Inv. Ex. 2 | Inv. Ex. 3 |
|---|---|---|---|---|---|---|
| Holding Pressure, bar | 1,200 | 950 | 950 | 950 | 950 | 950 |
| Back Pressure, bar | 60 | 10 | 10 | 10 | 10 | 10 |

Test Methods and Standards Used for Characterization of the Molded Specimens

The process of fabricating the specimens for testing includes first dry blending or compounding the partially neutralized ethylene acid copolymer (or ionomer) and PE components to form sample blend compositions. Once each of the sample blend compositions is injection molded to form a sample molded specimen, the sample molded specimens are characterized in accordance with the test procedures described in Table VII.

TABLE VII

| Test Methods and Properties | |
|---|---|
| Property | Test Method |
| Impact Resistance - Charpy type A[1] | ISO 179-1 |
| Flexural Modulus | ISO 178 |
| Haze | ASTM D1003, measured on 2 mm plates |
| Gloss | ASTM D2457, measured on 2 mm plates |

Table VIII describes the results of the testing methods described above; and results show the differences in optical properties for the formulations of the Examples.

TABLE VIII

| Testing Results | | | | | | | |
|---|---|---|---|---|---|---|---|
| Properties | Testing Method | Comp. Ex. A | Comp. Ex. B | Comp. Ex. C | Inv. Ex. 1 | Inv. Ex. 2 | Inv. Ex. 3 |
| Impact Resistance ($kJ \cdot m^{-3}$) | ISO 179-1 | 95.8 | 97.8 | 95.8 | 91.9 | 84.9 | 78.3 |
| Flexural Modulus (MPa) | ISO 178 | 339 | 413 | 396 | 333 | 315 | 275 |
| Gloss (gloss 60°) | ASTM D2457 | 88 | 83 | 87 | 95 | 104 | 112 |
| Haze (%) | ASTM D1003 | 79 | 100 | 93 | 56 | 27 | 25 |

Discussion of Results

As observed in Table V, each of the molded test specimens of Inv. Ex. 1-3 displays a much lower haze and higher gloss than the molded test specimens of Comp. Ex. A-C while maintaining adequate impact and mechanical properties for the targeted application.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter

What is claimed is:

1. An injection molded closure article comprising a composition blend of:

(a) at least one substantially linear polyolefin elastomer component, wherein the at least one substantially polyolefin elastomer has a melt index of from 0.5 decigram per minute to 40 decigrams per minute and a density of from 0.850 gram per cubic centimeter to 0.910 gram per cubic centimeter; and (b) at least one partially neutralized ethylene acid copolymer resin component; wherein the at least one partially neutralized ethylene acid copolymer resin comprises magnesium, lithium, zinc, sodium, and mixtures thereof; wherein the comonomer of the at least one partially neutralized ethylene acid copolymer resin comprises acrylic acid, methacrylic acid or mixtures thereof; wherein the comonomer content is from 9 weight percent to 30 weight percent based on the total weight of the monomers present in the at least one partially neutralized ethylene acid copolymer resin; and wherein the melt index of the at least one partially neutralized ethylene acid copolymer resin is from 0.5 decigram per minute to 25 decigrams per minute.

2. The molded article of claim 1, wherein the at least one partially neutralized ethylene acid copolymer resin is at least partially neutralized at a range of from 20 percent to 70 percent neutralization.

3. The molded article of claim 1, wherein the molded closure article is a cap member for a perfume container.

4. The molded article of claim 1, wherein the concentration of the polyolefin elastomer is from 0.5 weight percent to 50 weight percent; and wherein the concentration of the partially neutralized ethylene acid copolymer resin is from 50 weight percent to 99.5 weight percent.

5. The molded article of claim 1, wherein the at least one partially neutralized ethylene acid copolymer resin is a partially neutralized ethylene acrylic acid copolymer or a partially neutralized ethylene methacrylic acid copolymer; and wherein the content of the acrylic acid or methacrylic acid groups of the ethylene acrylic acid copolymer or the ethylene methacrylic acid copolymer is from 9 weight percent to 30 weight percent.

6. The molded article of claim 1, wherein the at least partially neutralized ethylene acid copolymer is an ethylene methacrylic acid copolymer or an ethylene acrylic acid copolymer in which the carboxylic acid groups of the methacrylic acid copolymer or the acrylic acid copolymer are at least partially neutralized with sodium ions.

7. The molded article of claim 1, wherein the at least one partially neutralized ethylene acid copolymer resin comprises (i) from 9 percent to 30 percent by weight copolymerized units of acrylic acid or methacrylic acid, and (ii) from 70 percent by weight to 91 percent by weight copolymerized units of ethylene, based on the total weight of the monomers present in the at least one partially neutralized ethylene acid copolymer resin; and wherein 20 percent to 70 percent of carboxylic acid groups of the at least one partially neutralized ethylene acid copolymer resin are neutralized as carboxylic acid salts comprising sodium cations.

8. The molded article of claim 1, wherein the composition includes further additives selected from the group consisting of pigments, pigment masterbatches, optical brighteners, compatibilizers, and mixtures thereof.

9. A process for preparing an injection molded closure article comprising the steps of:

(I) providing an injection molding composition including a composition blend of:

(a) at least one substantially linear polyolefin elastomer component, wherein the at least one substantially linear polyolefin elastomer has a melt index of from 0.5 decigram per minute to 40 decigrams per minute and a density of from 0.850 g/cc to 0.910 g/cc; and (b) at least one neutralized ethylene acid copolymer resin component; wherein the at least one partially neutralized ethylene acid copolymer resin comprises magnesium, lithium, zinc, sodium, and mixtures thereof; wherein the comonomer of the at least one partially neutralized ethylene acid copolymer resin comprises acrylic acid, methacrylic acid or mixtures thereof; wherein the comonomer content is from 9 weight percent to 30 weight percent based on the total weight of the monomers present in the at least one partially neutralized ethylene acid copolymer resin; and wherein the melt index of the at least one partially neutralized ethylene acid copolymer resin is from 0.5 decigram per minute to 25 decigrams per minute;

(II) feeding the injection molding composition of step (I) to an injection molding apparatus; and (III) injection molding the composition of step (I) with the injection molding apparatus of step (II) to form the injection molded closure article having a high gloss, low haze, high impact resistance, and high chemical resistance.

10. The process of claim 9, wherein the at least one partially neutralized ethylene acid copolymer resin is at least partially neutralized at a range of from 20 percent to 70 percent neutralization.

11. The process of claim 9, wherein the injection molded closure article is a cap member for a perfume container.

12. A molded article prepared by the process of claim 9.

* * * * *